US011092223B2

United States Patent
Handa et al.

(10) Patent No.: US 11,092,223 B2
(45) Date of Patent: Aug. 17, 2021

(54) DUAL-TYPE STRAIN WAVE GEARING

(71) Applicant: HARMONIC DRIVE SYSTEMS INC., Tokyo (JP)

(72) Inventors: Jun Handa, Azumino (JP); Yoshihide Kiyosawa, Azumino (JP); Noboru Takizawa, Azumino (JP); Xin Yue Zhang, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 1012 days.

(21) Appl. No.: 15/322,640

(22) PCT Filed: Jul. 3, 2015

(86) PCT No.: PCT/JP2015/069242
§ 371 (c)(1),
(2) Date: Apr. 19, 2018

(87) PCT Pub. No.: WO2016/013378
PCT Pub. Date: Jan. 28, 2016

(65) Prior Publication Data
US 2019/0203819 A1    Jul. 4, 2019

(30) Foreign Application Priority Data

Jul. 23, 2014   (JP) ............................ JP2014-149370

(51) Int. Cl.
*F16H 1/32*      (2006.01)
*F16H 49/00*     (2006.01)
*F16H 55/08*     (2006.01)

(52) U.S. Cl.
CPC ............. *F16H 49/001* (2013.01); *F16H 1/32* (2013.01); *F16H 55/0833* (2013.01); *F16H 55/08* (2013.01)

(58) Field of Classification Search
CPC ........................... F16H 49/001; F16H 55/0833
(Continued)

(56) References Cited

U.S. PATENT DOCUMENTS 8,656,800 B2 *  2/2014  Cho ..................... F16H 49/001
                                                      74/411
2011/0088496 A1   4/2011  Cho et al.
(Continued)

FOREIGN PATENT DOCUMENTS

JP      01-108441      *  1/1989
JP      H01-91151 U       6/1989
(Continued)

OTHER PUBLICATIONS

International Search Report (Form PCT/ISA/210) dated Sep. 29, 2015, by the Japanese Patent Office in corresponding International Application No. PCT/JP2015/069242 and partial English Translation (1 page).
(Continued)

*Primary Examiner* — William C Joyce
(74) *Attorney, Agent, or Firm* — Buchanan Ingersoll & Rooney PC

(57) ABSTRACT

An externally toothed gear of a dual-type strain wave gearing is provided with first and second external teeth having different teeth numbers, and a gap formed between these teeth as a cutter clearance area for tooth cutters. The maximum width L1 of the gap is 0.1 to 0.3 times the width L of the externally toothed gear. The depth from the tooth top land of the first external teeth to the deepest part of the gap is 0.9 to 1.3 times the depth of the first external teeth, and the depth from the tooth top land of the second external teeth to the deepest part of the gap is 0.9 to 1.3 times the depth of the second external teeth. The tooth bottom fatigue strength
(Continued)

of the externally toothed gear provided with differing numbers of first and second external teeth is increased.

4 Claims, 3 Drawing Sheets

(58) Field of Classification Search
USPC .......................................................... 74/640
See application file for complete search history.

(56) References Cited

U.S. PATENT DOCUMENTS

2016/0178044 A1\* 6/2016 Takizawa .............. F16H 49/001
                                                                           74/640
2017/0059024 A1\* 3/2017 Kiyosawa ............. F16H 49/001

FOREIGN PATENT DOCUMENTS

| JP | H02-275147 A | | 11/1990 |
|----|----|----|----|
| JP | 2011-112214 A | | 6/2011 |
| WO | 2009/157607 A1 | | 12/2009 |
| WO | WO 2013/084538 | \* | 6/2013 |
| WO | WO 2014/155791 | \* | 10/2014 |

OTHER PUBLICATIONS

International Search Report (Form PCT/ISA/237) dated Sep. 29, 2015, by the Japanese Patent Office in corresponding International Application No. PCT/JP2015/069242.

\* cited by examiner

DUAL-TYPE STRAIN WAVE GEARING

TECHNICAL FIELD

The present invention relates to a strain wave gearing which has a pair of internally toothed gears, a cylindrical externally toothed gear capable of flexing in a radial direction, and a wave generator.

BACKGROUND ART

Strain wave gearings having cylindrical externally toothed gears are typically provided with a stationary-side internally toothed gear secured so as not to rotate, a wave generator that is a rotation-inputting element, a drive-side internally toothed gear that is a reduced-rotation-outputting element, and a cylindrical externally toothed gear capable of flexing in the radial direction and meshing with the stationary-side internally toothed gear and drive-side internally toothed gear. In typical strain wave gearings, the externally toothed gear is caused to flex into an ellipsoidal shape, the ellipsoidally flexed externally toothed gear meshing with the stationary-side and drive-side internally toothed gears at both end positions along the major axis of the ellipsoidal shape.

Patent Documents 1 discloses typical strain wave gearings in which the number of teeth of the stationary-side internally toothed gear is two greater than that of the externally toothed gear, and the number of teeth of the drive-side internally toothed gear is equal to that of the externally toothed gear. The external teeth of the externally toothed gear are bisected at the tooth-trace-direction central portion thereof, one of the external-tooth portions being capable of meshing with the stationary-side internally toothed gear, and the other of the external-tooth portions being capable of meshing with the drive-side internally toothed gear. When the wave generator rotates, the externally toothed gear rotates more slowly at a speed ratio corresponding to the difference in the number of teeth with respect to the stationary-side internally toothed gear. The reduced rotation of the externally toothed gear is outputted from the drive-side internally toothed gear, which rotates integrally with the externally toothed gear.

Strain wave gearing are characterized in which it is possible to have high reduction ratios and a high response without backlash. However, in some cases in which strain wave gearings having a low reduction ratio are desirable. In the strain wave gearings, when the speed ration thereof is made small, the radial flexing amount of the externally toothed gear thereof becomes large. In the consideration of mechanical characteristics, mechanical performances and other factors such as the flexible externally toothed gear meshes with the internally toothed gear while it is being flexed, typical strain wave gearings have a speed ratio of 50 or higher, and it is difficult for the strain wave gearings to have a speed ratio as low as 20 to 50.

Patent Document 2 discloses a strain wave gearing in which the number of teeth of the stationary-side internally toothed gear is two greater than that of the externally toothed gear, and the number of teeth of the drive-side internally toothed gear is two less than that of the externally toothed gear. In this strain wave gearing, when the wave generator rotates, the externally toothed gear rotates more slowly at a speed ratio corresponding to the difference in the number of teeth with respect to the stationary-side internally toothed gear. The rotation of the externally toothed gear is increased at a speed ratio corresponding to the difference in number of teeth between the externally toothed gear and the drive-side internally toothed gear, and is outputted from the drive-side internally toothed gear. The rotation outputted from the drive-side internally toothed gear is reduced at a speed ratio of less than 50 in relation to the rotation inputted to the wave generator.

Patent Documents 2 and 3 disclose strain wave gearings having wave generators that have two rows of ball bearings. This type of wave generator is configured from a rigid plug having an ellipsoidally contoured outer-peripheral surface, and two rows of ball bearings fitted to the outer-peripheral surface. The flexible externally toothed gear is pressed radially outward by the two major-axis end portions of the outer-peripheral surfaces of the ellipsoidally flexed outer races of the ball bearings, and the meshing of the flexible externally toothed gear with respect to the first and second rigid internally toothed gears is sustained.

PRIOR ART DOCUMENTS

Patent Documents

Patent Document 1: JP-A 2011-112214
Patent Document 2: JP-A 02-275147
Patent Document 3: JP-U 01-91151

SUMMARY OF THE INVENTION

Problems to be Solved by the Invention

It is considered that in the externally toothed gear used herein, first teeth capable of meshing with one first internally toothed gear and second teeth capable of meshing with another second internally toothed gear are formed in the outer-peripheral surface of a radially flexible cylindrical body, the second teeth differing in number from the first teeth. Adopting such a configuration makes it possible to realize a strain wave gearing having a speed ratio of less than 50 in a similar manner as in the strain wave gearing disclosed in Patent document 2. Additionally, this configuration enables a strain wave gearing having a speed ratio of less than 50 to be designed with a greater degree of freedom than in the strain wave gearing disclosed in Patent Document 2.

In the present specification, a strain wave gearing that has an externally toothed gear in which first and second external teeth differing in number are formed in the outer-peripheral surface of a flexible cylindrical body is referred to as a "dual-type strain wave gearing." The dual-type strain wave gearing has problems described hereinafter.

First, in a dual-type strain wave gearing, first external teeth and second external teeth of an externally toothed gear are formed in the outer-peripheral surface of a shared cylindrical body, and the tooth bottom rim parts of the first and second external teeth are connected to each other. The first and second external teeth differing in number are made to mesh with different internally toothed gears, respectively, so that the force applied on the first external teeth caused by meshing with the internal teeth of one internally toothed gear is largely different from the force applied on the second external teeth caused by meshing with the internal teeth of the other internally toothed gear. Specifically, different from the case in which the external teeth are separated into two parts along the tooth trace direction, since the first external teeth and the second external teeth differ in number, the tooth profiles of these two external teeth differ as well.

Accordingly, high stress concentration and large amount of torsion occur in portions between the first and second external teeth that are formed in the outer peripheral surface of the flexible cylindrical body formed from a thin-walled elastic body. As a result, in the first and second external teeth, their tooth-contact states with respect to the internal teeth at each point along the tooth trace direction are changed, and their tooth-land load distributions along the tooth trace direction are greatly fluctuated.

When the tooth-contact states are changed and the tooth-land load distributions are greatly fluctuated, the tooth bottom fatigue strength and load transfer torque of the externally toothed gear cannot be increased. In order to increase the tooth bottom fatigue strength and load transfer torque of the externally toothed gear, it is necessary that the tooth-contact distribution be made uniform so as to decrease the maximum tooth-contact load, and that tooth contact on each point along the tooth trace direction be kept in a suitable manner.

Further, the meshing states of the first and second external teeth with the respective internal teeth, especially their tooth-trace-direction meshing states are affected by the support rigidity of the wave generator. When the meshing states along the tooth trace direction are not appropriate, the transfer load torque is decreased.

Therefore, in order to increase the tooth bottom fatigue strength and transfer load torque of the externally toothed gear, it is necessary that the tooth-land load distribution be made uniform so as to reduce the maximum tooth-land load, and that tooth contact at each point along the tooth trace direction be kept in a suitable state. Further, in order to maintain an appropriate meshing state at each point along the tooth trace direction, the support rigidity of the wave generator must be increased.

Furthermore, if the externally toothed gear is not appropriately supported by the wave generator, the bearing-ball load distributions appeared in the two row of the ball bearings of the wave generator become uneven, whereby the lifetime of the bearings is shortened. Therefore, for the purpose that the bearing-ball load distribution is made even and durability of the bearings is enhanced, it is necessary to support the meshing portions between the first external teeth and the internal teeth of one internally toothed gear, and the meshing portions between the second external teeth and the internal teeth of the other internally toothed gear in an appropriate matter.

In view of the above point, an object of the present invention is to provide a dual-type strain wave gearing which can easily realize a low speed ratio, has an increased tooth bottom fatigue strength of the flexible externally toothed gear, and has a large load capacity.

In addition to the above object, another object of the present invention is to provide a large-load-capacity dual-type strain wave gearing which is provided with a wave generator having a high durability and supporting the externally toothed gear with high rigidity.

Means of Solving the Problems

In order to solve the problems described above, a dual-type strain wave gearing of the present invention is characterized by including:

a rigid first internally toothed gear in which first internal teeth are formed;

a rigid second internally toothed gear in which second internal teeth are formed, the second internally toothed gear being disposed so as to be coaxially aligned in parallel with the first internally toothed gear;

a flexible externally toothed gear in which first external teeth capable of meshing with the first internal teeth and second external teeth capable of meshing with the second internal teeth are formed in an outer-peripheral surface of a radially flexible cylindrical body, the second teeth differing in number from the first teeth, and the externally toothed gear being disposed coaxially inside the first and second internally toothed gears; and a wave generator which causes the externally toothed gear to flex into an ellipsoidal shape, causing the first external teeth to partially mesh with the first internal teeth and causing the second external teeth to partially mesh with the second internal teeth;

wherein a gap is formed between a tooth-trace-direction inner-end surface of the first external teeth and a tooth-trace-direction inner-end surface of the second external teeth, the gap having a prescribed width along a tooth trace direction, and the gap having a tooth-depth-direction deepest part at a tooth-trace-direction central portion;

the gap functions as a cutter clearance area for tooth-cutting cutters used for cutting the first and second external teeth;

a relationship $$0.1L < L1 < 0.3L$$

is satisfied, where L is a width from a tooth-trace-direction outer end of the first external teeth to a tooth-trace-direction outer end of the second external teeth, and L1 is a tooth-trace-direction maximum width of the gap; and relationships $$0.9h1 < t1 < 1.3h1 \text{ and}$$

$$0.9h2 < t2 < 1.3h2$$

are satisfied, where h1 is a tooth depth of the first external teeth, h2 is a tooth depth of the second external teeth, t1 is a tooth-depth-direction depth from a tooth top land of the first external teeth to the deepest part, and t2 is a tooth-depth-direction depth from a tooth top land of the second external teeth to the deepest part.

In the dual-type strain wave gearing, although the first external teeth meshing with the first internal teeth and the second external teeth meshing with the second internal teeth are connected at their tooth bottom rim parts with each other, their tooth numbers and modules differ to each other, and therefore their tooth profiles differ to each other.

A speed ratio R1 between the first internally toothed gear and the externally toothed gear having first external teeth, a speed ratio R2 between the second internally toothed gear and the externally toothed gear having second external teeth, and a speed ratio R of the strain wave gearing are respectively defined as follows:

$$R1 = 1/\{(Zf1 - Zc1)/Zf1\},$$

$$R2 = 1/\{(Zf2 - Zc2)/Zf2\}, \text{ and}$$

$$R = (R1 \times R2 - R1)/(-R1 + R2),$$

where Zc1 is the tooth number of the first internal teeth, Zc2 is the tooth number of the second internal teeth, Zf1 is the tooth number of the first external teeth, and Zf2 is the tooth number of the second external teeth.

According to the strain wave gearing of the present invention, it is possible to obtain a speed ratio of less than 50, e.g., a speed ratio appreciably lower than 30. Additionally, unlike in the prior art, first external teeth and second external teeth that differ in number and module are formed as the external teeth of the externally toothed gear. Accordingly, there is a greater degree of freedom in the design for setting the speed ratio, and a strain wave gearing having a low speed ratio can be realized more easily than in the prior art.

Further, in the externally toothed gear of the dual-type strain wave gearing of the present invention, different tooth cutters are used to cut the first and second external teeth. For this reason, the gap functioning as a cutter clearance area is formed in the tooth-trace-direction central portion of the externally toothed gear, namely, between the first and second external teeth.

The manner in which the gap is formed has a prominent effect on the tooth contact of the first external teeth with respect to the first internal teeth along the tooth trace direction, as well as the tooth land load distribution. The manner in which the gap is formed similarly has a prominent effect on the tooth contact of the second external teeth with respect to the second internal teeth along the tooth trace direction, as well as the tooth land load distribution.

According to the present invention, in view of these points, the maximum width L1 of the gap is set within a range of 0.1 to 0.3 times the width L of the externally toothed gear, and the maximum depths t1 and t2 are set within a range of 0.9 to 1.3 times the tooth depths h1, h2 of the first and second external teeth. It was confirmed that forming the gap in this manner makes it possible to maintain uniformity in the tooth-trace-direction tooth land load distributions of the first and second external teeth and to maintain a satisfactory state for the tooth contact of the first and second external teeth with respect to the first and second internal teeth at each tooth-trace-direction position.

According to the present invention, it is possible to realize a strain wave gearing having a speed ratio less than 30, and to realize a strain wave gearing having a high tooth bottom fatigue strength and a high load capacity.

Next, the wave generator of the dual-type strain wave gearing of the present invention has:

a first wave bearing comprising a ball bearing for supporting the first external teeth, and a second wave bearing comprising a ball bearing for supporting the second external teeth; and bearing-ball centers of the first wave bearing and the second wave bearing are located at positions that are equidistant, along the tooth trace direction, from a tooth-trace-direction center of the gap; and wherein, where an inter-ball-center distance Lo is a distance between the bearing-ball centers of the first and second wave bearings, the inter-ball-distance is set so as to increase correspondingly with an increase in a maximum width L1 of the gap, and satisfies a relationship $$0.35L < Lo < 0.7L.$$

In the prior art, a wave generator having two rows of ball bearings is used in order to increase the area in which the externally toothed gear is supported. The two rows of ball bearings were arranged offset toward the tooth-width-direction central portion of the externally toothed gear, without any consideration to the inter-ball-center distance.

In the present invention, the inter-ball-center distance Lo between two rows of wave bearings is increased such that it is possible to increase rigidity for supporting first and second external teeth differing in number, and to improve the tooth contact of each of the external teeth with respect to internal teeth at each tooth-trace-direction position. Specifically, a configuration is adopted in which the inter-ball-center distance Lo lengthens (increases) correspondingly with an increase in the tooth-trace-direction maximum length L1 of the gap, which is formed between the first and second external teeth and functions as a cutter clearance area. The range of increase of the inter-ball-center distance Lo is set to 0.35 to 0.7 times the width L of the externally toothed gear.

According to the present invention, it is possible to arrange the first and second wave bearings such that the ball centers are positioned at suitable tooth-trace-direction positions with respect to each of the first and second external teeth in accordance with the width of the gap that is formed. This makes it possible to reliably support the first and second external teeth, using the first and second wave bearings, at each tooth-trace-direction position of each of the first and second external teeth (i.e., to increase the supporting rigidity of the wave generator).

As a result, it is possible to improve the tooth contact of the first and second external teeth at each tooth-trace-direction position, and to increase the tooth bottom fatigue strength thereof. It is also possible to average the bearing-ball load distribution of each of the wave bearings of the wave generator, and to reduce the maximum load; therefore, the service life of the wave generator can be improved.

In the dual-type strain wave gearing of the present invention, generally, the number $Zf1$ of the first external teeth differs from a number $Zc1$ of the first internal teeth, and the number $Zf2$ of second external teeth differs from a number $Zc2$ of second internal teeth. For example, the number $Zf1$ of first external teeth is less than the number $Zc1$ of first internal teeth, and the number $Zc1$ of first internal teeth and the number $Zc2$ of second internal teeth are equal to each other.

In addition, the wave generator is set to be a rotation-inputting element; and either one of the first internally toothed gear and second internally toothed gear is set to be a stationary-side internally toothed gear secured so as not to rotate, and the other of the first internally toothed gear and second internally toothed gear is a drive-side internally toothed gear that is a reduced-rotation-outputting element.

Furthermore, the first and second external teeth of the externally toothed gear are flexed into an ellipsoidal shape, a three-lobe shape or other non-circular shape by the wave generator. This makes the externally toothed gear to mesh with the rigid internally toothed gear on plural positions apart from one another along the circumferential direction. Typically, the externally toothed gear is flexed into an ellipsoidal shape and is meshed with the internally toothed gear on two positions apart from 180 degrees along the circumferential direction (i.e. on both end positions of the major axis of the ellipsoidal shape). In this case, the differences between the tooth number $Zf1$ of the first external teeth and the tooth number $Zf2$ of the second external teeth are set to be 2n, where n is a positive integer.

MODE FOR CARRYING OUT THE INVENTION

An embodiment of a dual-type strain wave gearing to which the present invention is applied is described below with reference to the attached drawings.

Figure 1:
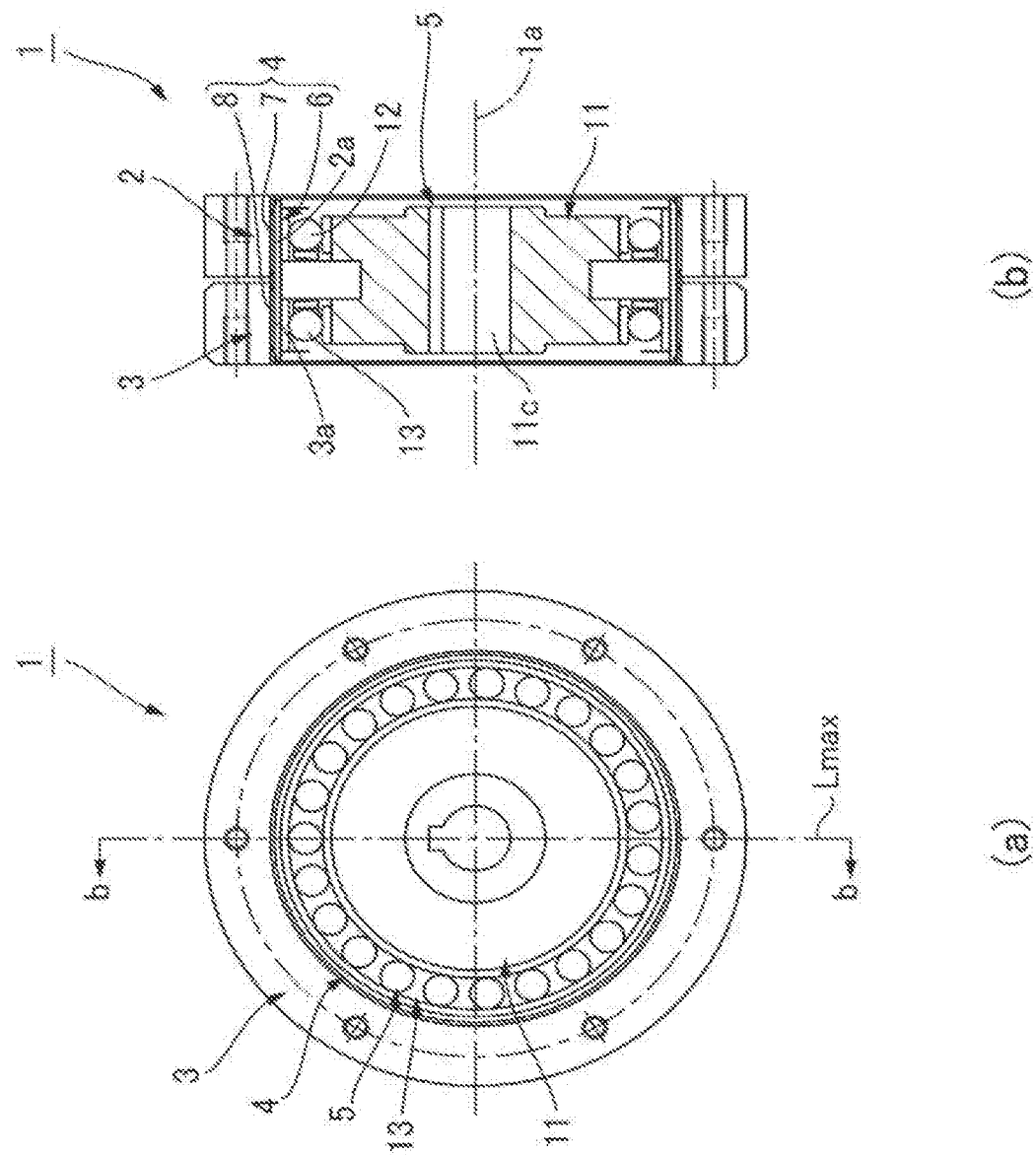
FIGS. 1(a) and 1(b) are an end-surface views and a longitudinal cross-sectional view of a dual-type strain wave gearing to which the present invention is applied.
Figure 2:
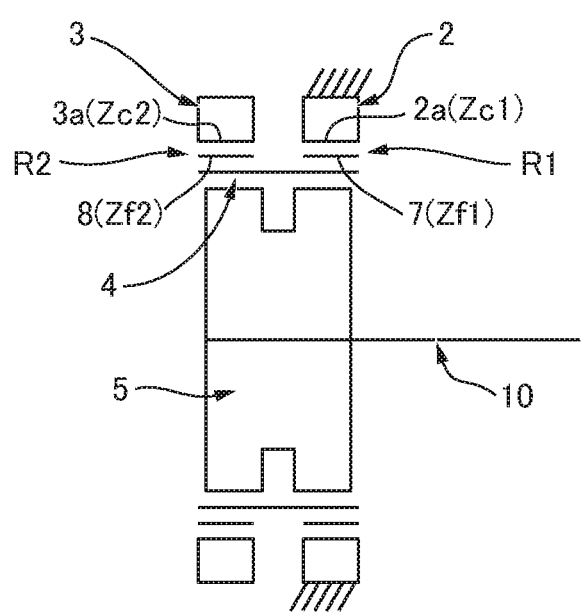
FIG. 2 is a schematic diagram of the dual-type strain wave gearing shown in FIG. 1.

FIG. 1 is an end-surface view and a longitudinal cross-sectional view showing a dual-type strain wave gearing (referred to below simply as "strain wave gearing") according to an embodiment of the present invention, and FIG. 2 is a schematic diagram of the same. The strain wave gearing 1, which is used as, e.g., a gear reducer, has an annular rigid first internally toothed gear 2, an annular rigid second internally toothed gear 3, a cylindrical flexible externally toothed gear 4 comprising a radially flexible thin-walled elastic body, and an ellipsoidally contoured wave generator 5.

The first and second internally toothed gears 2, 3 are disposed so as to be coaxially aligned in parallel with each other, with a prescribed gap therebetween, along the direction of a central axis 1a. In the present example, the first internally toothed gear 2 is a stationary-side internally toothed gear secured so as not to rotate, the number of first internal teeth 2a thereof being indicated by Zc1. The second internally toothed gear 3 is a rotatably supported drive-side internally toothed gear, the number of second internal teeth 3a thereof being indicated by Zc2. The second internally toothed gear 3 is the reduced-rotation-outputting element of the strain wave gearing 1.

The cylindrical externally toothed gear 4 is disposed coaxially inside the first and second internally toothed gears 2, 3. The externally toothed gear 4 has a cylindrical body 6 that is a radially flexible thin-walled elastic body, first external teeth 7 and second external teeth 8 formed in the circular outer-peripheral surface of the cylindrical body 6, and a gap 9 (refer to FIG. 3) formed between the external teeth 7, 8 on either side, the gap 9 functioning as a cutter clearance area. The first external teeth 7 are formed on one side along the central axis 1a direction of the circular outer-peripheral surface of the cylindrical body 6, and the second external teeth 8 are formed on the other second-internal-teeth 3a side of the circular outer-peripheral surface. The first and second external teeth 7, 8 are formed such that the central-axis 1a direction is the tooth trace direction.

Specifically, the first external teeth 7 are formed on the side opposing the first internal teeth 2a, and are capable of meshing with the first internal teeth 2a, the number of first external teeth 7 being indicated by Zf1. The second external teeth 8 are formed on the side opposing the second internal teeth 3a, and are capable of meshing with the second internal teeth 3a, the number of second external teeth 8 being indicated by Zf2. The numbers Zf1, Zf2 of teeth are different from each other. Further, the first external teeth 7 and the second external teeth 8 are apart from each other in the tooth-trace direction.

The wave generator 5 has an ellipsoidally contoured rigid plug 11, and a first wave bearing 12 and second wave bearing 13, the first and second wave bearings being fitted to the ellipsoidal outer-peripheral surface of the rigid plug 11. The first and second wave bearings 12, 13 are formed from ball bearings.

The wave generator 5 is inserted into the inner-peripheral surface of the cylindrical body 6 of the externally toothed gear 4, and causes the cylindrical body 6 to flex in an ellipsoidal shape. Therefore, the first and second external teeth 7, 8 are also flexed in an ellipsoidal shape. The ellipsoidally flexed externally toothed gear 4 meshes with the first and second internally toothed gears 2, 3 at both end positions along the major axis Lmax of the ellipsoidal shape. Specifically, the first external teeth 7 mesh with the first internal teeth 2a at both end positions along the major axis of the ellipsoidal shape, and the second external teeth 8 mesh with the second internal teeth 3a at both end positions along the major axis.

The wave generator 5 is the rotation-input element of the strain wave gearing 1. The rigid plug 11 of the wave generator 5 has a shaft hole 11c, in which an input rotation shaft 10 (refer to FIG. 2) is securely connected in a coaxial arrangement. For example, a motor output shaft may be securely connected in a coaxial arrangement in the shaft hole 11c. When the wave generator 5 rotates, the positions at which the first external teeth 7 of the externally toothed gear 4 and the stationary-side first internal teeth 2a mesh, and the positions at which the second external teeth 8 of the externally toothed gear 4 and the drive-side second internal teeth 3a mesh, move along the circumferential direction.

The number Zf1 of first external teeth 7 and the number Zf2 of second external teeth 8 differ from each other; in the present example, the number Zf2 of second external teeth is greater. The number Zc1 of first internal teeth 2a and the number Zf1 of first external teeth 7 also differ from each other; in the present example, the number Zc1 of first internal teeth 2a is greater. The number Zc2 of second internal teeth 3a and the number Zf2 of second external teeth 8 differ from each other; in the present example, the number Zc2 of second internal teeth 3a is less.

In the present example, the externally toothed gear 4 is caused to flex in an ellipsoidal shape, and meshes with the internally toothed gears 2 and 3 at two locations along the circumferential direction. Therefore, the difference between the number Zc1 of first internal teeth 2a and the number Zf1 of first external teeth 7 is 2j, where j is a positive integer. The difference between the number Zc2 of second internal teeth 3a and the number Zf2 of second external teeth 8 is 2k, where k is a positive integer.

$$Zc1 = Zf1 + 2j$$

$$Zc2 = Zf2 - 2k$$

In a specific example, the numbers of teeth are set as follows j=k=1:

$$Zc1 = 62$$

$$Zf1 = 60$$

$$Zc2 = 62$$

$$Zf2 = 64$$

The speed ratio R1 between the first internally toothed gear 2 and the first external teeth 7, and the speed ratio R2 between the second internally toothed gear 3 and the second external teeth 8, are respectively defined as follows:

$$i1 = 1/R1 = (Zf1 - Zc1)/Zf1 = (60 - 62)/60 = -1/30$$

$$i2 = 1/R2 = (Zf2 - Zc2)/Zf2 = (64 - 62)/64 = 1/32$$

Therefore, R1=−30, and R2=32.

The speed ratio R of the strain wave gearing 1 is represented by the following formula using the speed ratios R1, and R2. Thus, according to the present invention, a strain wave gearing having a dramatically low speed ratio (low reduction ratio) can be realized (a negative speed ratio indicates that output rotation progresses in the direction opposite that of input rotation).

$$R = (R1 \times R2 - R1)/(-R1 + R2)$$

$$= (-30 \times 32 + 30)/(30 + 32)$$
$$= -930/62$$
$$= -15$$

(Gap: Cutter Clearance Area)

Figure 3:
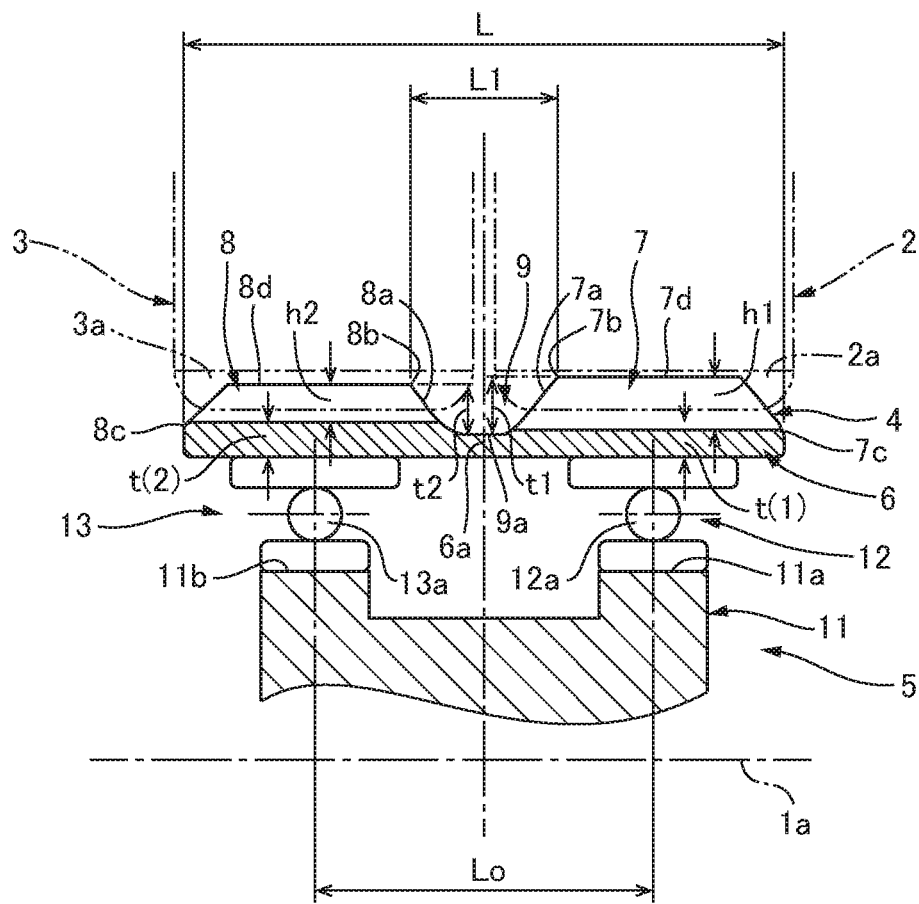
FIG. 3 is a partial enlarged cross-sectional view of the strain wave gearing shown in FIG. 1.

FIG. 3 is a partial enlarged cross sectional view of the strain wave gearing, which shows the externally toothed gear 4 as well as the first and second wave bearings 12 and 13 of the wave generator 5. The gap 9 formed between the first and second external teeth 7 and 8 functions as a cutter clearance area for tooth-cutting cutters used for cutting the first and second external teeth 7 and 8.

The first and second external teeth 7 and 8 will be explained at first. Since the first and second internal teeth 2a and 3a has substantially the same tooth width, the first external teeth 7 and the second external teeth 8 having the same tooth width are formed in a symmetrical state with respect to the tooth-trace-direction central position 6a of the cylindrical body 6. When the first and second internal teeth differ in tooth width with each other, the first and second external teeth 7 and 8 will correspondingly differ in tooth width.

The gap 9 has a prescribed width along the tooth trace direction; the deepest part, which is the part of the gap 9 that is formed deepest along the tooth depth direction, is formed in the tooth-trace-direction central portion. In the present example, the deepest part 9a is a portion at which the tooth-trace-direction central portion is defined by a straight line extending parallel to the tooth trace direction, as viewed from the tooth-thickness direction. At the two tooth-trace-direction ends of the deepest part 9a, a concave arcuate curve that defines the tooth-trace-direction inner-end surface 7a of the first external teeth 7 and a concave arcuate curve that defines the tooth-trace-direction inner-end surface 8a of the second external teeth 8 are smoothly connected. It is also possible to adopt a configuration in which the deepest part 9a is defined by a concave curved surface and the two inner-end surfaces 7a, 8a are defined by inclined straight lines. It is furthermore possible to adopt a configuration in which the deepest part 9a is defined by a straight line and the two inner-end surfaces 7a, 8a are defined by inclined straight lines.

The tooth-trace-direction width of the gap 9 in the present example gradually increases from the deepest part 9a along the tooth depth direction. The maximum width L1 in the tooth trace direction is the distance, along the tooth trace direction, from the tooth-trace-direction inner end 7b of the addendum circle of the first external teeth 7 to the tooth-trace-direction inner end 8b of the addendum circle of the second external teeth 8.

The relationship $$0.1L < L1 < 0.3L$$

is established, where L is the width from the tooth-trace-direction outer end 7c of the first external teeth 7 to the tooth-trace-direction outer end 8c of the second external teeth 8, and L1 is the tooth-trace-direction maximum width of the gap 9.

The depth of the deepest part 9a of the gap 9 is set as follows. The relationships $$0.9h1 < t1 < 1.3h1 \text{ and}$$

$$0.9h2 < t2 < 1.3h2$$

are established, where h1 is the tooth depth of the first external teeth 7, h2 is the tooth depth of the second external teeth 8, t1 is the tooth-depth-direction depth from the top land 7d of the first external teeth 7 to the deepest part 9a, and t2 is the tooth-depth-direction depth from the top land 8d of the second external teeth 8 to the deepest part 9a.

[Distance Between Bearing-Ball Centers]

The distance between the bearing-ball centers of the first and second wave bearings 12, 13 are described next with reference to FIG. 3.

In the rigid plug 11 of the wave generator 5, an ellipsoidally contoured first outer-peripheral surface 11a of fixed width is formed on one central-axis-direction side, and an ellipsoidally contoured second outer-peripheral surface 11b of fixed width is formed on the other central-axis-direction side. The first outer-peripheral surface 11a and the second outer-peripheral surface 11b are ellipsoidal outer-peripheral surfaces having the same shape and the same phase. The first and second outer-peripheral surfaces 11a and 11b may be different ellipsoidal shapes in accordance with the difference in the amount of deflection between the first and second external teeth 7 and 8.

The first wave bearing 12 is fitted to the first outer-peripheral surface 11a in a state of being flexed in an ellipsoidal shape, and the second wave bearing 13 is fitted to the second outer-peripheral surface 11b in a state of being flexed in an ellipsoidal shape. The first and second wave bearings 12, 13 are of the same size.

The bearing centers 12a, 13a of the first wave bearing 12 and second wave bearing 13 are located at positions that are equidistant, along the tooth width direction, from the tooth-trace-direction central position 6a on the externally toothed gear 4. The distance between bearing-ball centers is set so as to increase correspondingly with an increase in the maximum width L1 of the gap 9. Furthermore, the inter-ball-center distance Lo is set so as to reach a value within the range indicated by the following formula, Lo being the distance between bearing-ball centers.

$$0.35L < Lo < 0.7L$$

Other Embodiments

In the example described above, the first internally toothed gear 2 is configured as a stationary-side internally toothed gear, and the second internally toothed gear 3 is configured as a drive-side internally toothed gear. It is possible to instead configure the first internally toothed gear 2 as a drive-side internally toothed gear, and configure the second internally toothed gear 3 as a stationary-side internally toothed gear.

It is also possible to flex the externally toothed gear 4 into a non-circular shape other than an ellipsoidal shape, for example, into a non-circular shape such as a three-lobe shape. When h represents the number of meshing positions between the externally toothed gear flexed into a non-circular shape and the internally toothed gear, the difference in the number of teeth between the two gears may be set hp, where h is a positive integer equal to or more than 2, and p is a positive integer.

The invention claimed is:

1. A strain wave gearing comprising:
    a rigid first internally toothed gear formed with first internal teeth;
    a rigid second internally toothed gear formed with second internal teeth, the second internally toothed gear being disposed so as to be coaxially aligned in parallel with the first internally toothed gear;

a flexible externally toothed gear in which first external teeth capable of meshing with the first internal teeth and second external teeth capable of meshing with the second internal teeth are formed in an outer-peripheral surface of a radially flexible cylindrical body, the second teeth differing in number from the first teeth, and the externally toothed gear being disposed coaxially inside the first and second internally toothed gears; and a wave generator for flexing the externally toothed gear in an ellipsoidal shape to cause the first external teeth to partially mesh with the first internal teeth and to cause the second external teeth to partially mesh with the second internal teeth, wherein a gap is formed between a tooth-trace-direction inner-end surface of the first external teeth and a tooth-trace-direction inner-end surface of the second external teeth, the gap having a prescribed width along a tooth trace direction, and the gap having a deepest part along a tooth depth direction at a tooth-trace-direction central portion; and wherein the wave generator has a first wave bearing comprising a ball bearing for supporting the first external teeth, and a second wave bearing comprising a ball bearing for supporting the second external teeth;

$0.1L < L1 < 0.3L$, where L is a width from a tooth-trace-direction outer end of the first external teeth to a tooth-trace-direction outer end of the second external teeth, and L1 is a maximum width of the gap along a tooth trace direction; and $0.9h1 < t1 < 1.3h1$ $0.9h2 < t2 < 1.3h2$ and $t(1) < t(2)$, where h1 is a tooth depth of the first external teeth, h2 is a tooth depth of the second external teeth, t1 is a distance from a tooth top land of the first external teeth to the deepest part of the gap, t2 is a distance from a tooth top land of the second external teeth to the deepest part of the gap, t(1) is a rim wall thickness of the first external tooth, and t(2) is a rim wall thickness of the second external tooth, and bearing-ball centers of the first wave bearing and the second wave bearing are located at positions that are equidistant, along the tooth trace direction, from a tooth-trace-direction center of the gap;

where an inter-ball-center distance Lo is a distance between the bearing-ball centers of the first and second wave bearings, and the inter-ball-center distance is set so as to increase correspondingly with an increase in the maximum width L1 of the gap, and to satisfy a relationship $0.35L < Lo < 0.7L$.

2. The strain wave gearing according to claim 1, wherein a number of the first external teeth differs from a number of the first internal teeth, and a number of second external teeth differs from a number of second internal teeth.

3. The strain wave gearing according to claim 1, wherein a number of first external teeth is less than a number of first internal teeth, and a number of first internal teeth and a number of second internal teeth are equal to each other.

4. The strain wave gearing according to claim 1 wherein the wave generator causes the externally toothed gear to flex into an ellipsoidal shape so that the first external teeth are caused to mesh with the first internal teeth at two positions along a circumferential direction and the second external teeth are caused to mesh with the second internal teeth at two positions along the circumferential direction; and a difference between a number of the first external teeth and a number of the second external teeth is 2n, where n is a positive integer.

* * * * *